United States Patent
Wu et al.

(10) Patent No.: US 10,015,409 B2
(45) Date of Patent: Jul. 3, 2018

(54) ELECTRONIC DEVICE, PROCESSOR AND METHOD FOR SETTING A SENSOR

(71) Applicant: MediaTek Inc., Hsin-Chu (TW)

(72) Inventors: Mu-Hsing Wu, Zhubei (TW); Ching-Hsien Lin, Hsinchu (TW); Yu-Ming Wei, Kaohsiung (TW); Sheng-Long Yang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 134 days.

(21) Appl. No.: 14/856,810

(22) Filed: Sep. 17, 2015

(65) Prior Publication Data
US 2017/0085766 A1   Mar. 23, 2017

(51) Int. Cl.
*H04N 5/235* (2006.01)

(52) U.S. Cl.
CPC .................. *H04N 5/2351* (2013.01)

(58) Field of Classification Search
CPC .................................................... H04N 5/2351
USPC ......... 348/220.1, 221.1, 222.1, 229.1, 224.1, 348/227.1, 345, 349, 356, 362–366, 370; 396/61, 168, 169, 170, 194, 222, 235, 396/247, 357, 449, 452
See application file for complete search history.

(56) References Cited

U.S. PATENT DOCUMENTS

| | | | | |
|---|---|---|---|---|
| 2004/0218830 A1* | 11/2004 | Kang | ........................ | G06T 5/50 |
| | | | | 382/274 |
| 2008/0226279 A1* | 9/2008 | Dey | ........................ | G03B 7/08 |
| | | | | 396/234 |
| 2014/0307117 A1* | 10/2014 | Feng | .................... | H04N 5/2351 |
| | | | | 348/218.1 |

* cited by examiner

*Primary Examiner* — Cynthia Segura
(74) *Attorney, Agent, or Firm* — McClure, Qualey & Rodack, LLP

(57) ABSTRACT

An electronic device and a method for setting a sensor are provided. The electronic device includes a sensor and a processor. The processor is coupled to the sensor and configured to calculate a plurality of groups of candidate sensor settings every calculation cycle, wherein each calculation cycle includes one or more frames, and each of the groups of candidate sensor settings corresponds to one respective frame of the calculation cycle. Every frame of the calculation cycle, the processor is further configured to determine a respective group of adoptable sensor settings for each frame of the calculation cycle according to the plurality of groups of candidate sensor settings, wherein the respective group of adoptable sensor settings is for provision to set a sensor.

20 Claims, 11 Drawing Sheets

ELECTRONIC DEVICE, PROCESSOR AND METHOD FOR SETTING A SENSOR

BACKGROUND OF THE INVENTION

Field of the Invention

The invention generally relates to an electronic device, a processor, and a method for setting a sensor, and more particularly, to method performed by calculating a plurality of groups of candidate sensor settings.

Description of the Related Art

Recently, many electronic devices may be equipped with photographic devices, such as a digital camera, wherein the electronic devices may be mobile telephones, personal digital assistants, portable music and video players, and portable computer systems such as laptops, notebooks, tablet computers, and so on. It is therefore important that the digital cameras in electronic devices be able to produce the most visually appealing images in a wide variety of lighting and scene situations with limited or no interaction from the user, as well as in a computationally and cost-effective manner.

One feature that has been implemented in some digital cameras to create visually appealing images is known as "auto exposure." Auto exposure (AE) can be defined as any operation that automatically calculates and/or manipulates certain camera exposure parameters, e.g., exposure time, gain, or f-number, in such a way that the currently exposed scene is captured in a desirable manner.

However for conventional AE technology, in one calculation cycle, only one group of sensor settings is generated for a plurality of frames (e.g. 3 frames or more) of the calculation cycle. Therefore, when updating the sensor settings, the digital camera may expend at least three frames in adjusting the settings of the sensor, and so the reaction time of updating the sensor settings can be slow, and the fluency of the image will suffer. In addition, when the environmental brightness changes, the digital camera may not update the sensor setting until next calculation cycle.

Therefore, solving the problems described above would improve the slow reaction time and low fluency when setting a sensor, and therefore is a subject worthy of discussion.

BRIEF SUMMARY OF THE INVENTION

Electronic devices and methods for setting a sensor are provided to overcome the problems mentioned above.

An aspect of the disclosure provides an electronic device. The electronic device comprises a sensor and a processor. The processor may be coupled to the sensor and configured to calculate a plurality of groups of candidate sensor settings every calculation cycle, wherein each calculation cycle may comprise one or more frames, and each of the groups of candidate sensor settings may correspond to a respective one frame of the calculation cycle. Every frame of the calculation cycle, the processor may be further configured to determine a respective group of adoptable sensor settings for each frame of the calculation cycle according to the plurality of groups of candidate sensor settings, wherein the respective group of adoptable sensor settings is for provision to set a sensor.

An embodiment of the invention provides a processor capable of setting a sensor. The processor may comprise a calculating unit, a determination unit and an output unit. The calculating unit may be configured to calculate a plurality of groups of candidate sensor settings every calculation cycle, wherein each calculation cycle can comprise one or more frames, and each of the groups of settings can correspond to a respective one frame of the calculation cycle. The determination unit may be configured to, every frame of the calculation cycle, determine a respective group of adoptable sensor settings for each frame of a calculation cycle according to the plurality of groups of candidate sensor settings. The output unit may be configured to output the respective group of adoptable sensor settings for setting a sensor.

In one embodiment of the invention, the processor may further comprise a monitor unit. The monitor unit may be configured to obtain a respective monitoring result for each of the frames, wherein the monitoring result may indicate monitored variations in environmental brightness in each of the one or more frames of the calculation cycle. The calculating unit may determine whether to calculate one or more new groups of candidate sensor settings for a currently monitored frame and/or at least one following frame according to the monitoring result.

In another embodiment of the invention, the monitor unit may be configured to obtain a respective monitoring result for each of the frames, wherein the monitoring result indicates monitored variations in environmental brightness in each of the one or more frames of the calculation cycle. The calculating unit may calculate one or more new groups of candidate sensor settings for a currently monitored frame and/or at least one following frame, and determine to adopt the groups of candidate sensor settings or the new groups of candidate sensor settings for a currently monitored frame and/or at least one following frame according to the monitoring result.

Another aspect of the disclosure provides a method for setting a sensor. The method comprises the steps of calculating a plurality of groups of candidate sensor settings every calculation cycle, wherein each calculation cycle may comprise one or more frames, and each of the groups of settings may correspond to a respective one frame of the calculation cycle; determining a respective group of adoptable sensor settings for each frame of a calculation cycle according to the plurality of groups of candidate sensor settings every frame of the calculation cycle, wherein the respective group of adoptable sensor settings is for provision to set a sensor.

In one embodiment of the invention, the method may further comprise a step of obtaining a respective monitoring result for each of the frames, wherein the monitoring result indicates monitored variations in environmental brightness in each of the one or more frames of the calculation cycle; and determining whether to calculate one or more new groups of candidate sensor settings for a currently monitored frame and/or at least one following frame according to the monitoring result. In another embodiment of the invention, the method further comprises a step of obtaining a respective monitoring result for each of the frames, wherein the monitoring result indicates monitored variations in environmental brightness in each of the one or more frames of the calculation cycle; calculating one or more new groups of candidate sensor settings for a currently monitored frame and/or at least one following frame; and determining to adopt the groups of candidate sensor settings or the new groups of candidate sensor settings for a currently monitored frame and/or at least one following frame according to the monitoring result.

In some embodiments, the plurality of groups of candidate sensor settings may be calculated in a first frame of the calculation cycle in sequence. In some embodiments, each of the plurality of groups of candidate sensor settings may comprise automatic exposure time, gain, and/or aperture size. In some embodiments, each calculation cycle may comprise two or more frames.

In the embodiments, multiple groups of sensor settings may be calculated. In addition, whether to adopt new group(s) of sensor setting may be determined every frame. As such, the sensor setting can be updated every frame, thus improving the reaction capability for the display brightness to react to environment brightness. The improvement may include either or both of the AE reaction speed and smoothness in frame smoothness. Accordingly, compared to the conventional AE scheduling method, either or both of fluency and reaction time can be enormously improved in the embodiments.

Other aspects and features of the invention can become apparent to those with ordinary skill in the art upon review of the following descriptions of specific embodiments of the methods and electronic devices.

BRIEF DESCRIPTION OF THE DRAWINGS

The invention can become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In an embodiment of the invention, the plurality of groups of candidate sensor settings comprises at least one of these parameters, which include automatic exposure time, gain, aperture size, and so on.

Figure 1:
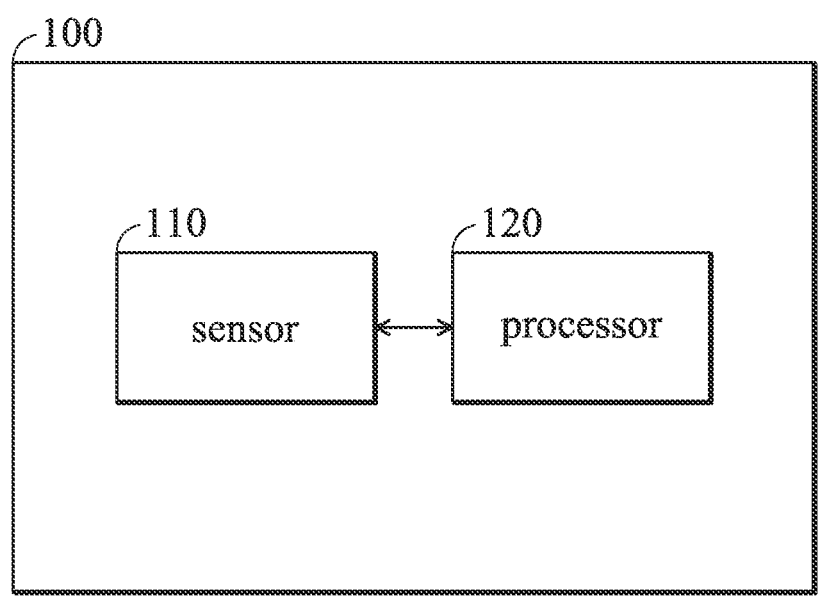
FIG. 1 is a block diagram of an electronic device according to an embodiment of the invention.

FIG. 1 is a block diagram of an electronic device 100 according to an embodiment of the invention. As shown in FIG. 1, the electronic device 100 comprises a sensor 110, and a processor 120. FIG. 1 presents a simplified block diagram in which only the elements relevant to the invention are shown. However, the invention should not be limited to what is shown in FIG. 1.

In an embodiment of the invention, the electronic device 100 may be a photography apparatus, such as a camera, or an electronic device which has photography function. The sensor can include one or more CMOS image sensors, one CCD image sensors, or one or more other types of image sensors. In an embodiment of the invention, the sensor 110 is configured to perform the exposure according to the sensor settings provided from the processor 120. In some embodiments, the sensor settings may comprise automatic exposure time, gain, and/or aperture size.

Figure 2A:
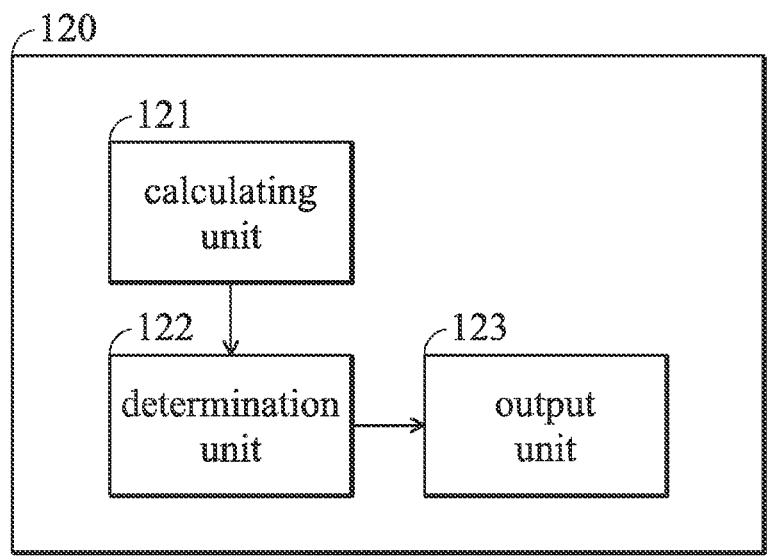
FIG. 2A is a block diagram of a processor according to a embodiment of the invention.

FIG. 2A is a block diagram of a processor according to an embodiment of the invention. The processor may be employed as the processor 120 in FIG. 1, and may be also applied to any electronic device other than the electronic device 100. As shown in FIG. 2A, the processor 120 comprises a calculating unit 121, a determination unit 122, and an output unit 123. FIG. 2A presents a simplified block diagram in which only the elements relevant to the invention are shown. However, the invention should not be limited to what is shown in FIG. 2A. The processor 120 can be implemented in the electronic device 100 in FIG. 2A but is not limited thereto.

When the electronic device 100 sets the sensor 110, the calculating unit 121 can be configured to calculate a plurality of groups of candidate sensor settings in every calculation cycle. In an embodiment of the invention, each calculation cycle comprises one or more frames, and each of the groups of candidate sensor settings corresponds to a respective frame comprised in the calculation cycle.

In an embodiment of the invention, the plurality of groups of candidate sensor settings comprises at least one of these parameters, which include automatic exposure time, gain, aperture size, and so on.

Preferably but not limitedly, each calculation cycle may comprise two or more frames. This means that the calculating unit 121 may not be required to calculate the groups of candidate sensor settings every frame. In an embodiment of the invention where each calculation cycle comprises two or more frames, the plurality of groups of candidate sensor settings may be calculated in a first frame of the calculation cycle in sequence. For example, when the calculation cycle comprises three frames, the calculating unit 121 may calculate the plurality of groups of candidate sensor settings in a first frame of the three frames every calculation cycle in sequence.

In addition, the calculating unit 121 may calculate one or more respective total values for one or more parameters of the candidate sensor settings first, and then allocate each of the total values to the frames of the calculation cycle by a respective percentage of the parameter for each frame.

For example, the calculation cycle comprises three frames. In the example, the calculating unit 121 may calculate a total value of automatic exposure time first, divide the total value of automatic exposure time into three parts, and respectively allocate the three parts of the total value to the three frames of the calculation cycle in sequence. Alternatively or additively, the calculating unit 121 may calculate a total value of gain and/or aperture size first, divide the total value of automatic gain and/or aperture size into three parts, and respectively allocate the three parts of the total value to the three frames of the calculation cycle in sequence.

After the calculating unit 121 has calculated a plurality of groups of candidate sensor settings for one calculation cycle, the determination unit 122 can be configured to determine a respective group of adoptable sensor settings for each frame of this calculation cycle according to the plurality of groups of candidate sensor settings. Contrary to the plurality of groups of candidate sensor settings are candidates and not necessary adopted, the respective group of adoptable sensor settings can be adopted or provided for setting a sensor.

In an embodiment of the invention, a determination about whether to adopt or abandon the candidate group of sensor settings can be performed for each frame of the calculation cycle. Specifically, in determining the respective group of adoptable sensor settings, the determination unit 122 may determine to adopt at least one group from among the groups of candidate sensor settings (i.e. determining the group(s) of candidate sensor settings to be the group(s) of adoptable sensor settings, for one or more frames), or to abandon the group(s) of candidate sensor settings. Preferably, the determination unit 122 may adopt at least one of the groups of candidate sensors settings. For example, the determination unit 122 may adopt a most recent one (i.e., a first one) of the groups of candidate sensors settings. The determination may be made by referring to environment brightness information, as will be explained more in the following embodiments.

In an embodiment of the invention, when the determination unit 122 determines to abandon the candidate group of sensor settings, the determination unit 122 may direct the calculating unit 121 to start a new calculation cycle and regenerate a plurality of new groups of candidate sensor settings. Similarly, the determination unit 122 may then adopt at least one of the new groups of candidate sensors settings and determine whether to adopt or abandon the rest groups of the new groups of candidate sensor settings other than the adapted group(s). In other words, the determination unit 122 may replace at least one abandoned group of candidate sensor settings with at least one new group of candidate sensor settings. It is noted that, in an alternative embodiment, the calculating unit 121 may prepare a plurality of new groups of candidate sensor settings before the determination.

Figure 2B:
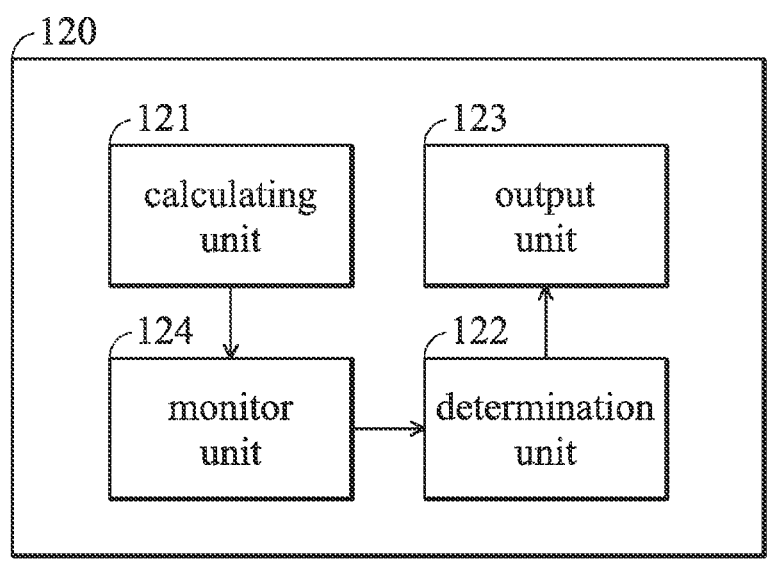
FIG. 2B is a block diagram of a processor according to another embodiment of the invention.

FIG. 2B is a block diagram of the processor 120 according to another embodiment of the invention. As shown in FIG. 2B, the processor 120 further comprises a monitor unit 124. FIG. 2B presents a simplified block diagram in which only the elements relevant to the invention are shown. However, the invention should not be limited to what is shown in FIG. 2B.

In an embodiment of the invention, after the calculating unit 121 has calculated a plurality of groups of candidate sensor settings for one calculation cycle, the monitor unit 124 is configured to obtain a respective monitoring result for each frame, wherein the monitoring result indicates monitored variations in environmental brightness in each of the one or more frames of the calculation cycle. The monitor unit 124 may receive data about the monitoring result from one or more light sensors capable of detecting environment light. In an embodiment of the invention, when the monitoring result is obtained by the monitor unit 124, the calculating unit 121 may determine whether to calculate one or more new groups of candidate sensor settings for a currently monitored frame and/or at least one following frame according to the monitoring result.

In an embodiment of the invention, when the monitoring result indicates that a variation of the environmental brightness is higher than a threshold, the calculating unit 121 can calculate one or more new groups of sensor settings for the currently monitored frame and/or one or more following frames. When the monitoring result indicates that a variation of the environmental brightness is not higher than a threshold, the calculating unit 121 cannot be required to calculate the one or more new groups of sensor settings for the currently monitored frame and/or one or more following frames.

In an embodiment of the invention, when the monitoring result indicates that the variation of the environmental brightness is higher than the threshold, the calculating unit 121 can adopt at least one group from one or more new groups of candidate sensor settings for the currently monitored frame and/or one or more following frames. When the monitoring result indicates that the variation of the environmental brightness is not higher than the threshold, the calculating unit 121 can adopt at least one group from one or more of the groups of candidate sensor settings (i.e. the original candidate sensor settings) for the currently monitored frame and/or one or more following frames.

Figure 3A:
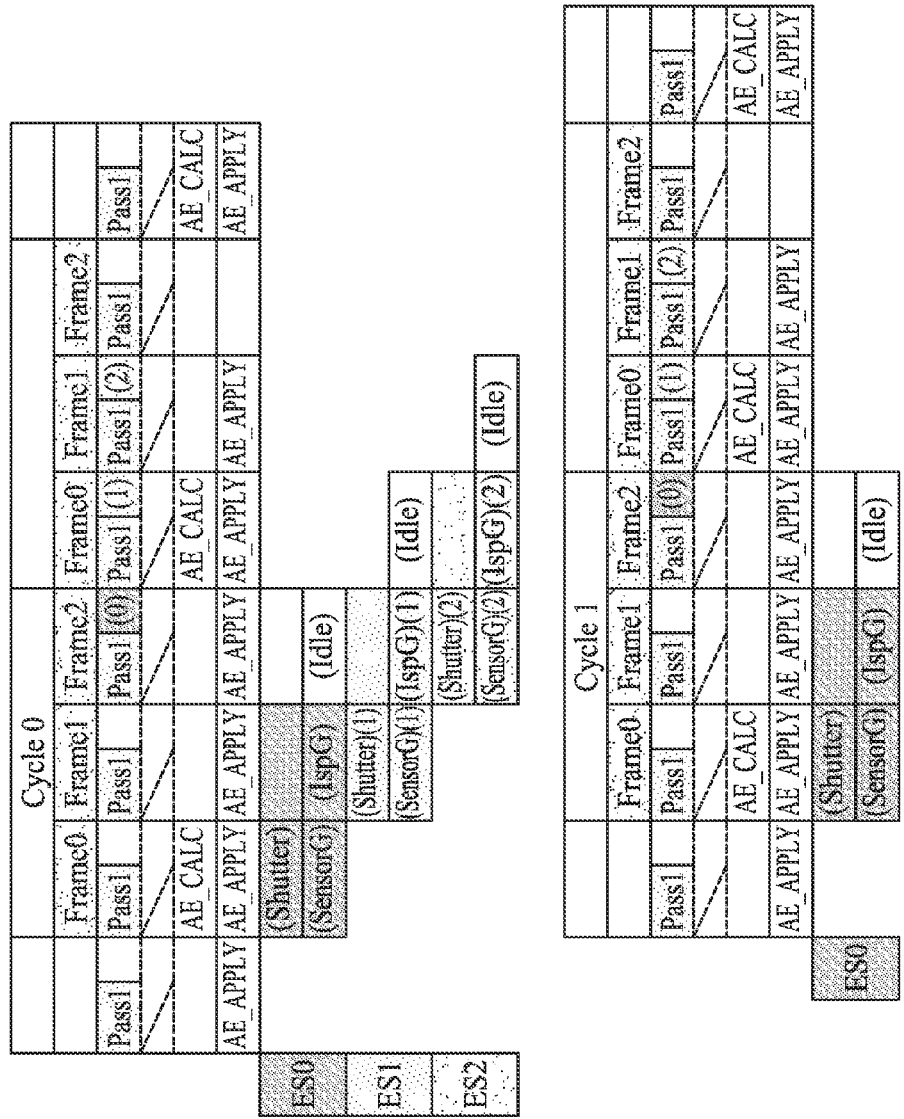
FIGS. 3A and 3B are a schematic diagram of the calculation cycle according to an embodiment of the invention.
Figure 3B:
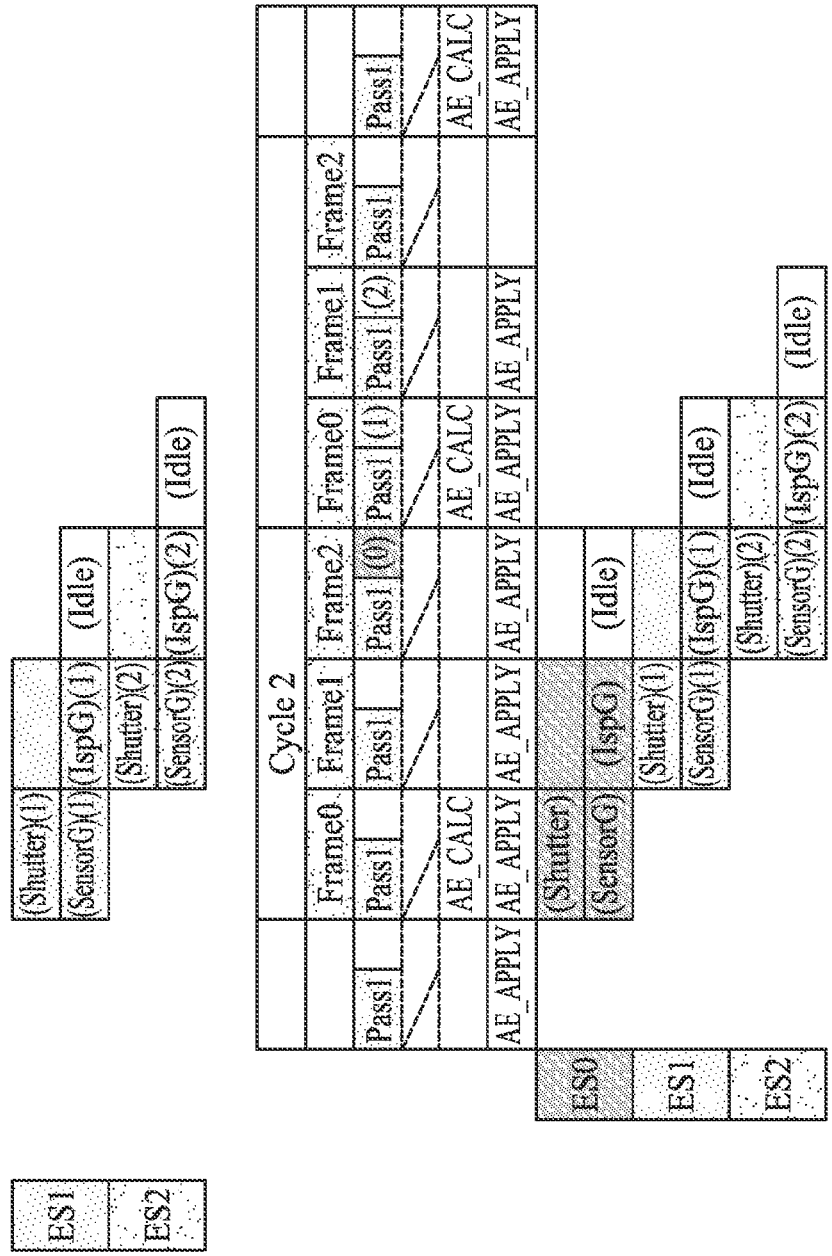

FIGS. 3A and 3B are a schematic diagram of the calculation cycle according to an embodiment of the invention. As shown in FIG. 0.3, each calculation cycle (e.g. Cycle 0, Cycle 1 and Cycle 3) may comprise three frames (e.g. Frame 0, Frame 1 and Frame 2), and each of the groups of candidate sensor settings corresponds to a respective frame in the calculation cycle. As shown, during frame 0 of cycle 0, data can be downloaded in Pass 1, and three groups of candidate sensor settings ES0, ES1 and ES2 are calculated in AE_CALC according to the data downloaded in frame 2 in a previous cycle. As shown, each group of three groups of candidate sensor settings ES0, ES1 and ES2 may include one or more settings, such as Shutter (i.e. exposure time), sensor gain (SensorG) and gain of image signal processor (IspG). In addition, the group of candidate sensor setting ES0 may be applied in AE_APPLY of Frame 0, the group of candidate sensor setting ES1 may be applied in AE_APPLY of Frame 1, and the group of candidate sensor setting ES2 may be applied in AE_APPLY of Frame 2. Procedures for cycle 1 and cycle 2 can be analogized from descriptions for cycle 0 and thus omitted here for brevity.

Figure 4:
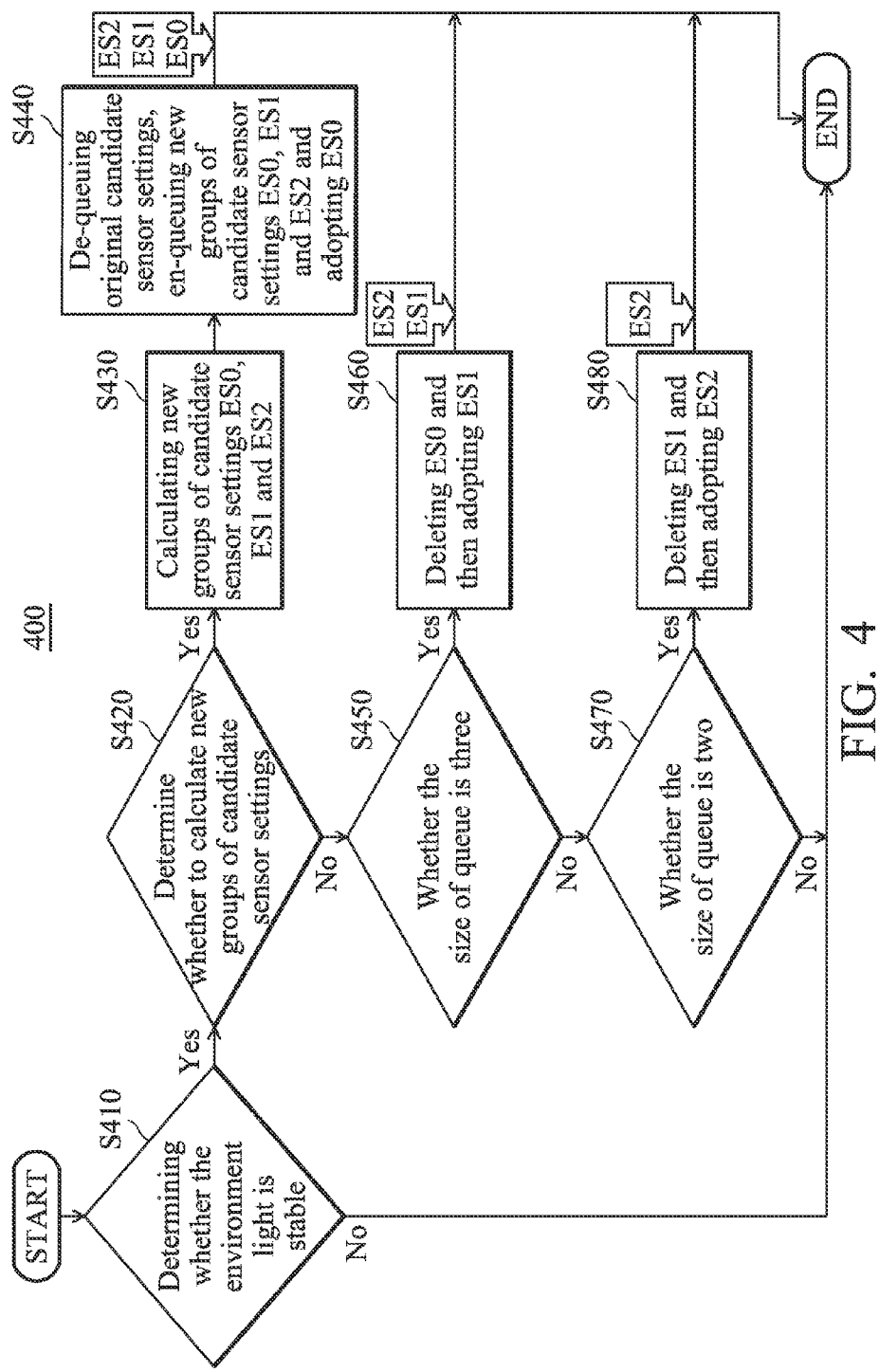
FIG. 4 is a flow chart illustrating the method for setting a sensor according to an embodiment of the invention.

FIG. 4 is a flow chart 400 illustrating the method for setting a sensor according to an embodiment of the invention. In FIG. 4, three groups of candidate sensor settings are calculated each frame and each groups of candidate sensor settings corresponds to different sensor setting. In step S410, the monitor unit 124 may receive data about a monitoring result from one or more light sensors capable of detecting environment light and determine whether the environment light is stable. If the environment light is stable (e.g., a variation not higher than a threshold), the calculating unit 121 may adopt original groups of candidate sensor settings. If the environment light is not stable (e.g., a variation higher than the threshold) the calculating unit 121 may determine whether to calculate one or more new groups of candidate sensor settings (e.g., ES0, ES1 and ES2) for at least a currently monitored frame according to the monitoring result from monitor unit 124 (S420). The calculating unit 121 may then determine to calculate new groups of candidate sensor settings ES0, ES1 and ES2 according to the monitoring result (S430). Then the calculating unit 121 may de-queue original candidate sensor settings in the memory, en-queue new groups of candidate sensor settings ES0, ES1 and ES2 to the memory and adopt ES0 (S440). When the calculating unit 121 determines not to calculate new groups of candidate sensor settings ES0, ES1 and ES2 according to the monitoring result, the calculating unit 121 may determine whether the size of queue is three (i.e. the memory comprise three groups of candidate sensor settings) (S450). When the size of queue is three, the calculating unit 121 may delete ES0 and then adopt ES1 (S460). When the size of queue is not three, the calculating unit 121 may determine whether the size of queue is two (i.e. the memory comprise two groups of candidate sensor settings) (S470). When the size of queue is two, the calculating unit 121 may delete ES1 and then adopt ES2 (S480). When the size of queue is not two, the procedure may be ended.

Figure 5A:
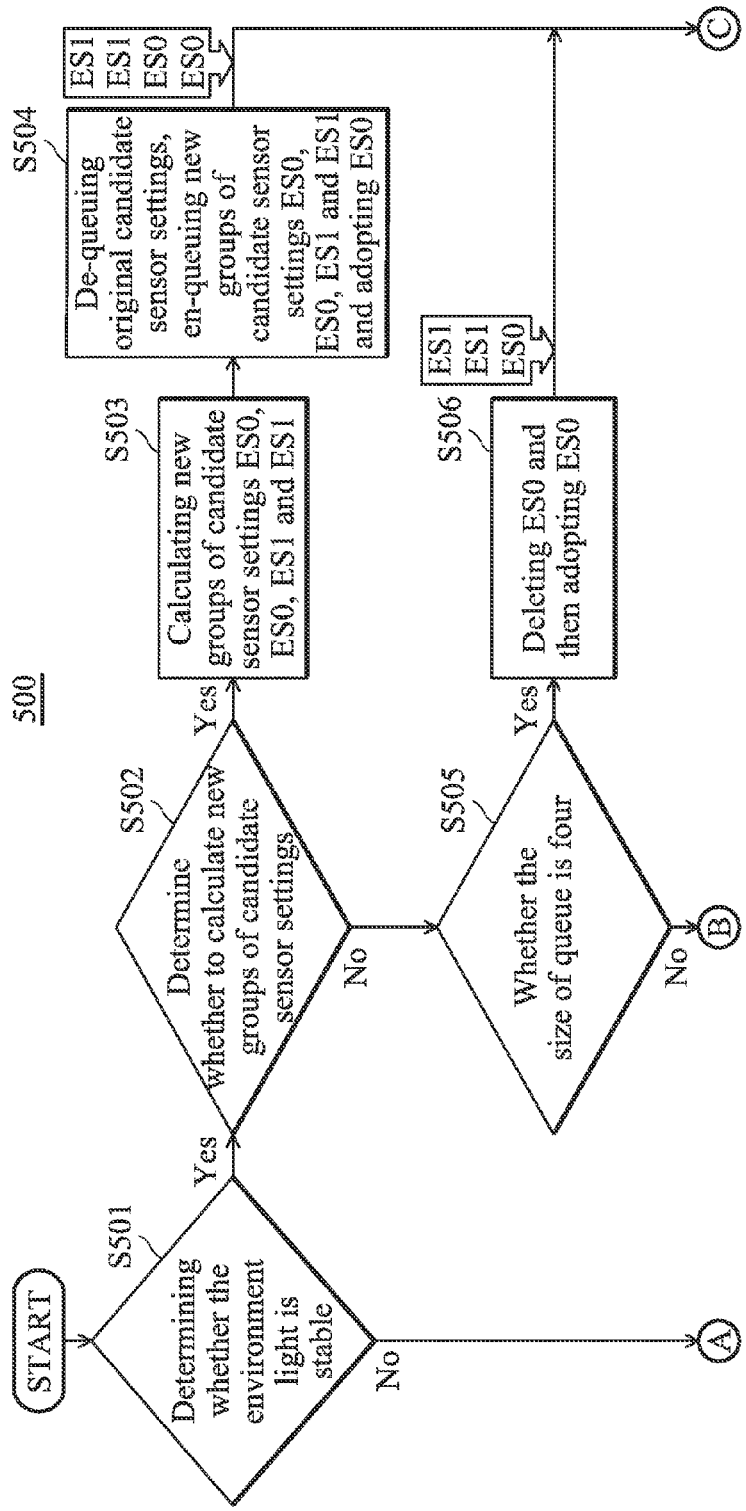
FIGS. 5A-5B are a flow chart illustrating the method for setting a sensor according to another embodiment of the invention.
Figure 5B:
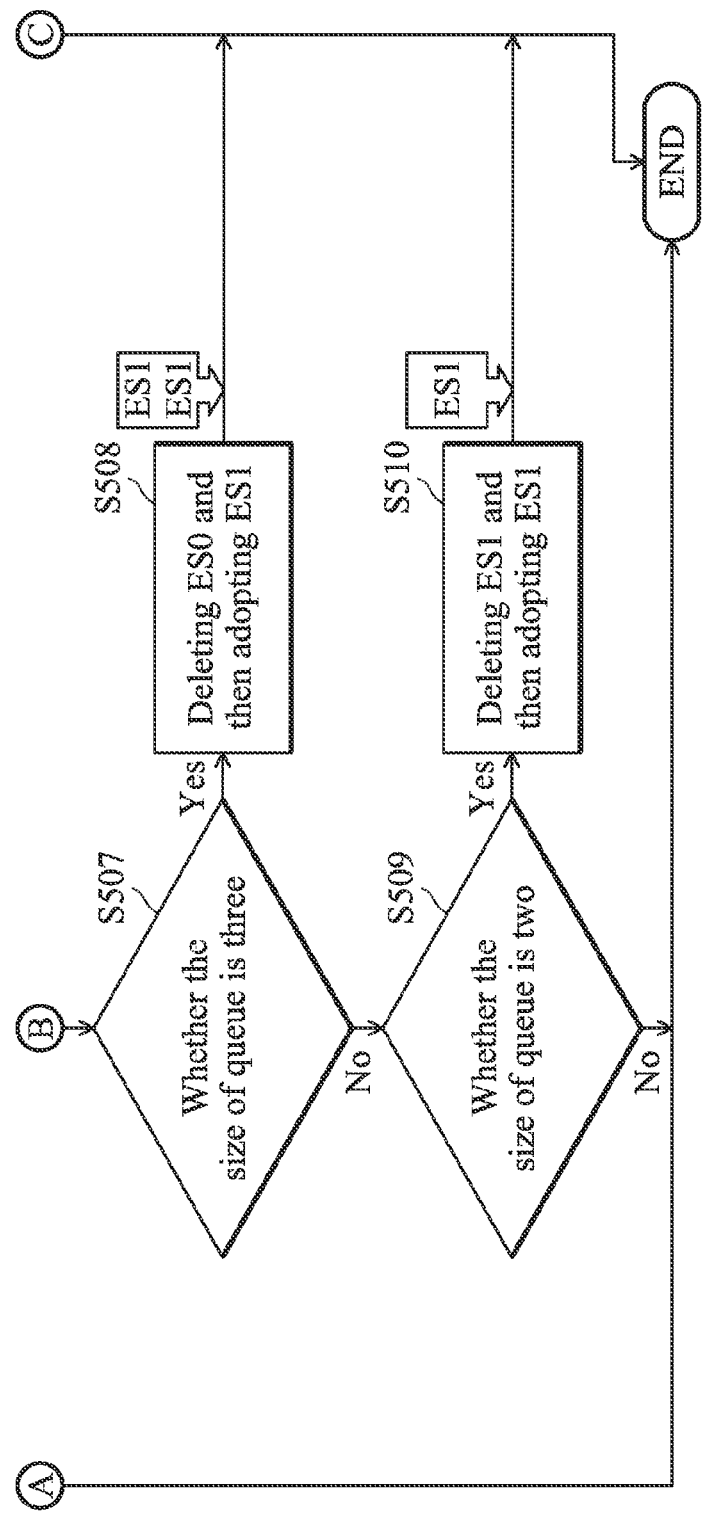

FIGS. 5A-5B are a flow chart 500 illustrating the method for setting a sensor according to another embodiment of the invention. In FIGS. 5A-5B, four groups of candidate sensor settings are calculated each frame and each two of the groups of candidate sensor settings corresponds to the same sensor setting. In step S501, the monitor unit 124 may receive data about the monitoring result from one or more light sensors capable of detecting environment light and determine whether the environment light is stable. If the environment light is stable (e.g., a variation not higher than the threshold) the calculating unit 121 may adopt original groups of candidate sensor settings. If the environment light is not stable (e.g., a variation higher than the threshold) the calculating unit 121 may determine whether to calculate new groups of candidate sensor settings ES0, ES0, ES1 and ES1 for a currently monitored frame according to the monitoring result from monitor unit 124 (S502). The calculating unit 121 determines to calculate new groups of candidate sensor settings ES0, ES0, ES1 and ES1 according to the monitoring result (S503). Then the calculating unit 121 may de-queue original candidate sensor settings in the memory, en-queue new groups of candidate sensor settings ES0, ES0, ES1 and ES1 to the memory and adopt ES0 (S504). When the calculating unit 121 determines not to calculate new groups of candidate sensor settings ES0, ES0, ES1 and ES1 according to the monitoring result, the calculating unit 121 may determine whether the size of queue is four (i.e. the memory comprise four groups of candidate sensor settings) (S505). When the size of queue is four, the calculating unit 121 may delete ES0 and then adopt ES0 (S506). When the size of queue is not four, the calculating unit 121 may determine whether the size of queue is three (i.e. the memory comprise three groups of candidate sensor settings) (S507). When the size of queue is three, the calculating unit 121 may delete ES0 and then adopt ES1 (S508). When the size of queue is not three, the calculating unit 121 may determine whether the size of queue is two (i.e. the memory comprise two groups of candidate sensor settings) (S509). When the size of queue is two, the calculating unit 121 may delete ES1 and then adopt ES1 (S510). When the size of queue is not two, the procedure may be ended.

The invention should not be limited to what are shown in FIG. 4 and FIGS. 5A-5B. Different numbers of groups of candidate sensor settings may be calculated each frame and each of the groups of candidate sensor settings may corresponds to the same or different sensor settings.

In another embodiment of the invention, after the monitor unit 124 has generated a respective monitoring result for each of the frames, the calculating unit 121 can calculate one or more new groups of candidate sensor settings for a currently monitored frame and/or at least one following frame first. Then, the calculating unit 121 will determine to adopt the one or more groups of candidate sensor settings, or adopt the one or more new groups of candidate sensor settings for a currently monitored frame and/or at least one following frame according to the monitoring result.

In above embodiment, when the monitoring result indicates that the variation of the environmental brightness is higher than the threshold, the calculating unit 121 will adopt at least one group from the one or more new groups of candidate sensor settings for the currently monitored frame and/or one or more following frames. When the monitoring result indicates that the variation of the environmental brightness is not higher than the threshold, the calculating unit 121 will adopt at least one group from the one or more groups of candidate sensor settings for the currently monitored frame and/or one or more following frames.

When the processor 120 determines the respective group of adoptable sensor settings, the output unit 123 can be configured to output the respective group of adoptable sensor settings for setting the sensor 110.

Figure 6:
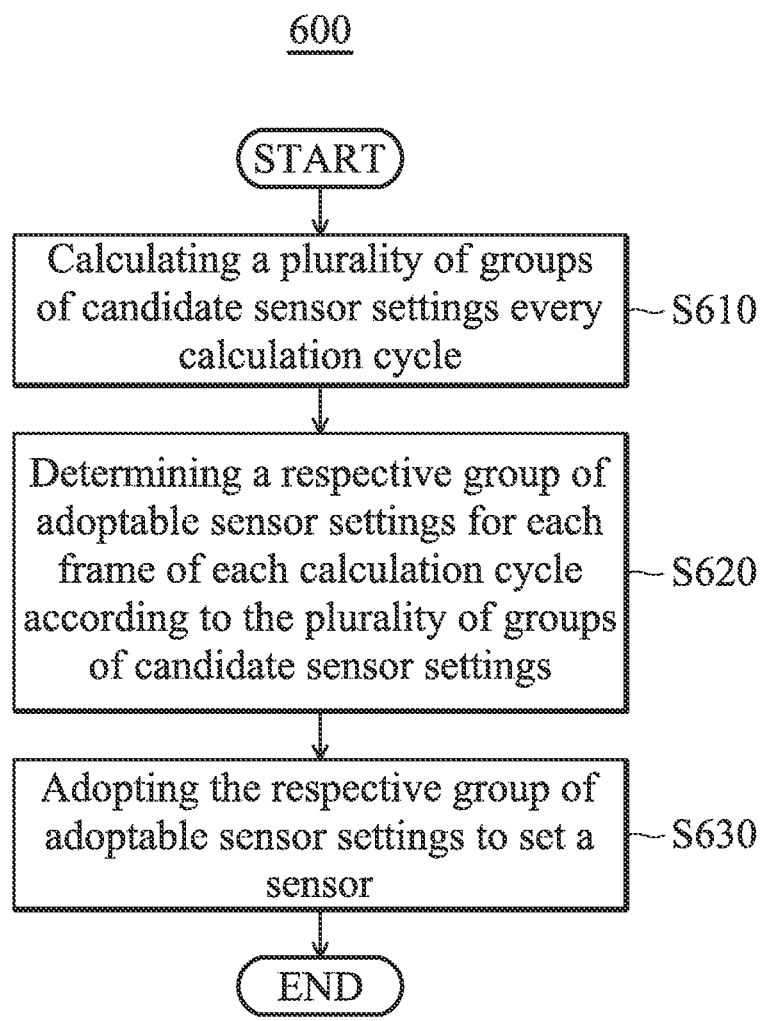
FIG. 6 is a flow chart illustrating the method for setting a sensor according to an embodiment of the invention.

FIG. 6 is a flow chart 600 illustrating the method for setting a sensor according to an embodiment of the invention. The method for setting a sensor may be applied to the electronic device 100 but is not limited thereto. As shown in FIG. 6, in step S610, a plurality of groups of candidate sensor settings can be calculated every calculation cycle, wherein each calculation cycle comprises one or more frames, and each of the groups of settings corresponds to a respective one frame of the calculation cycle. In an embodiment of the invention, the plurality of groups of candidate sensor settings can be calculated in a first frame of the calculation cycle in sequence. In an embodiment of the invention, each of the plurality of groups of candidate sensor settings comprises automatic exposure time, gain, and/or aperture size.

In an embodiment of the invention, each calculation cycle comprises two or more frames. In an embodiment of the invention where each calculation cycle comprises two or more frames, when each calculation cycle comprises two or more frames, step S610 further comprises the steps of the electronic device 100 calculating one or more respective total values for one or more parameters and then allocating each of the total values to the frames of the calculation cycle by a respective percentage of the parameter for each frame.

In step S620, a respective group of adoptable sensor settings can be determined for each frame of each calculation cycle according to the plurality of groups of candidate sensor settings. In step S630, the respective group of adoptable sensor settings can be provided or adopted to set a sensor.

Figure 7:
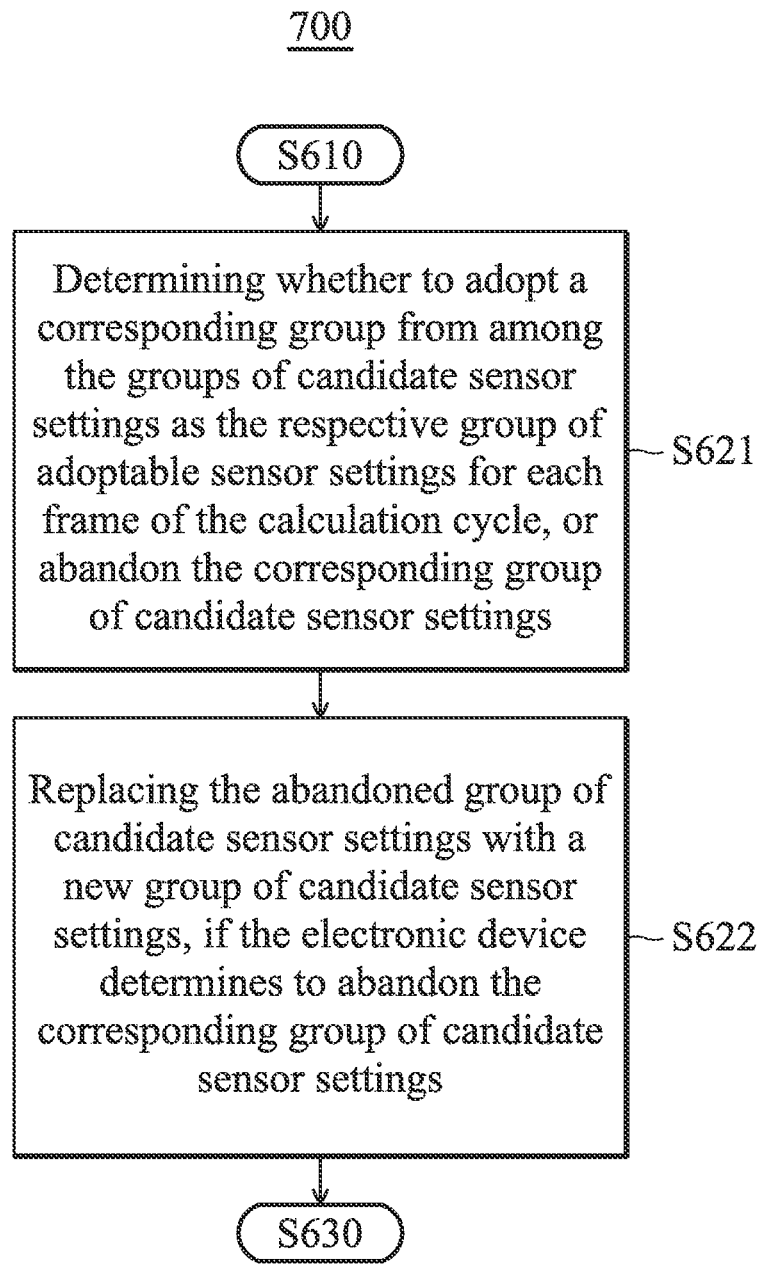
FIG. 7 is a flow chart illustrating a determination step of FIG. 6 according to an embodiment of the invention.

FIG. 7 is a flow chart 700 illustrating step S620 of FIG. 6 according to an embodiment of the invention. In step S621, the electronic device 100 determines whether to adopt a corresponding group from among the groups of candidate sensor settings as the respective group of adoptable sensor settings for each frame of the calculation cycle, or abandon the corresponding group of candidate sensor settings. In step S622, when the electronic device 100 determines to abandon the corresponding group of candidate sensor settings, the electronic device 100 may replace the abandoned group of candidate sensor settings with a new group of candidate sensor settings.

Figure 8:
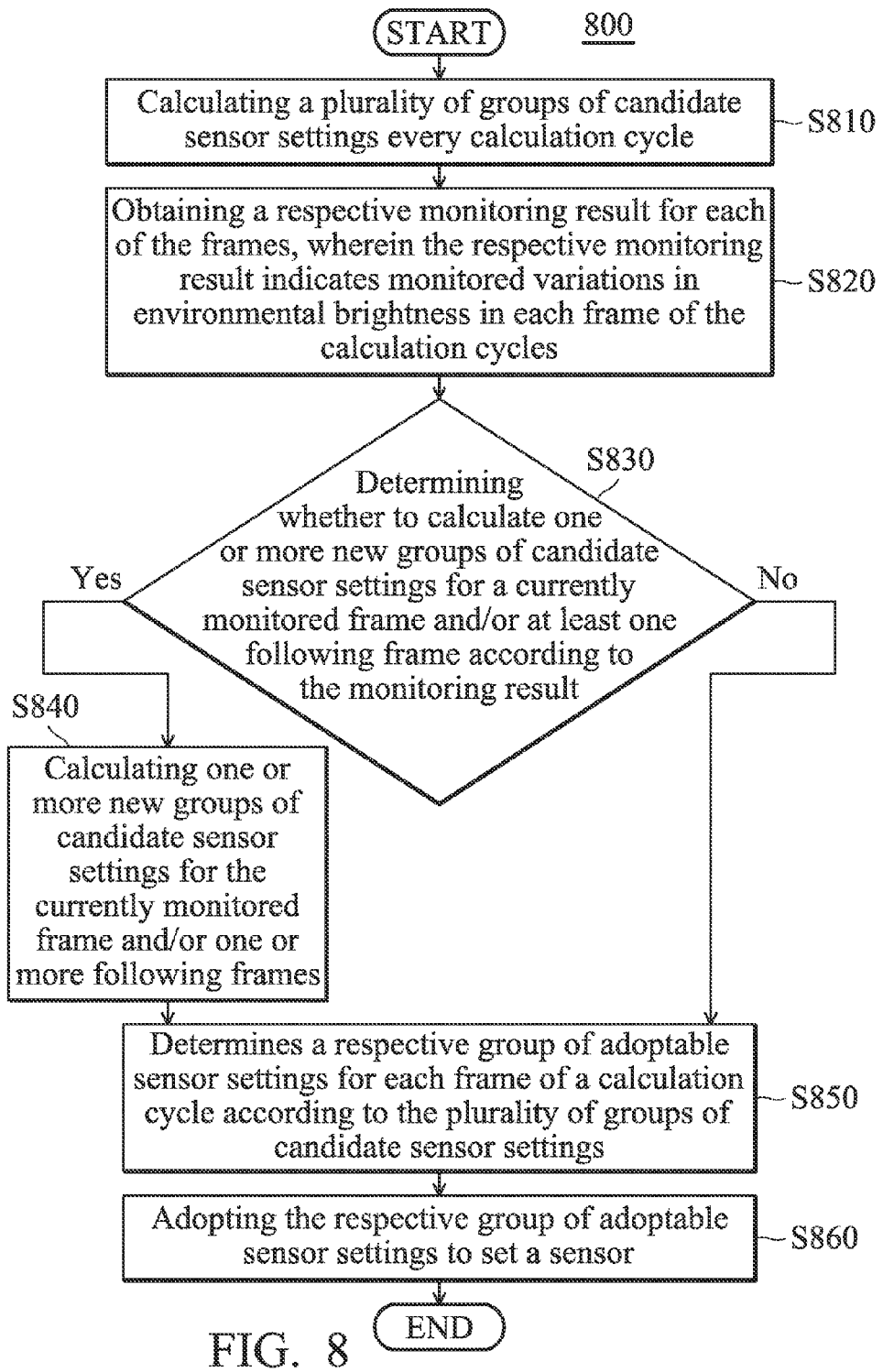
FIG. 8 is a flow chart illustrating the method for setting a sensor according to another embodiment of the invention.

FIG. 8 is a flow chart 800 illustrating the method for setting a sensor according to another embodiment of the invention. The method for setting a sensor may be applied to the electronic device 100 but not limited thereto. As shown in FIG. 8, in step S810, a plurality of groups of candidate sensor settings can be calculated every calculation cycle. Each calculation cycle can include one or more frames, and each of the groups of settings corresponds to a respective one frame of the calculation cycle.

In step S820, a respective monitoring result may be obtained for each of the frames, wherein the respective monitoring result indicates monitored variations in environmental brightness in each frame of the calculation cycle.

In step S830, whether to calculate one or more new groups of candidate sensor settings for a currently monitored frame and/or at least one following frame can be determined according to the monitoring result. When the monitoring result indicates that a variation of the environmental brightness is higher than a threshold, step S840 can be performed, in which it can be determined to calculate one or more new groups of candidate sensor settings for the currently monitored frame and/or one or more following frames.

When the monitoring result indicates that a variation of the environmental brightness is higher than a threshold, step S850 can be performed directly. In step S850, every frame of the calculation cycle, a respective group of adoptable sensor settings for each frame of a calculation cycle can be determined according to the plurality of groups of candidate sensor settings. In an embodiment of step S850, at least one group of candidate sensor settings can be abandoned, i.e., at least one group from among the new groups of candidate sensor settings can be adopted for the currently monitored frame and/or one or more following frames, when the monitoring result indicates that the variation of the environmental brightness is higher than the threshold. Conversely, at least one group of candidate sensor settings can be adopted for the currently monitored frame and/or one or more following frames, when the monitoring result indicates that the variation of the environmental brightness is not higher than the threshold.

In step S860, the respective group of adoptable sensor settings can be provided or adopted to set a sensor. More details about each step may be analogized by the above embodiments, thus omitted here for brevity.

Figure 9:
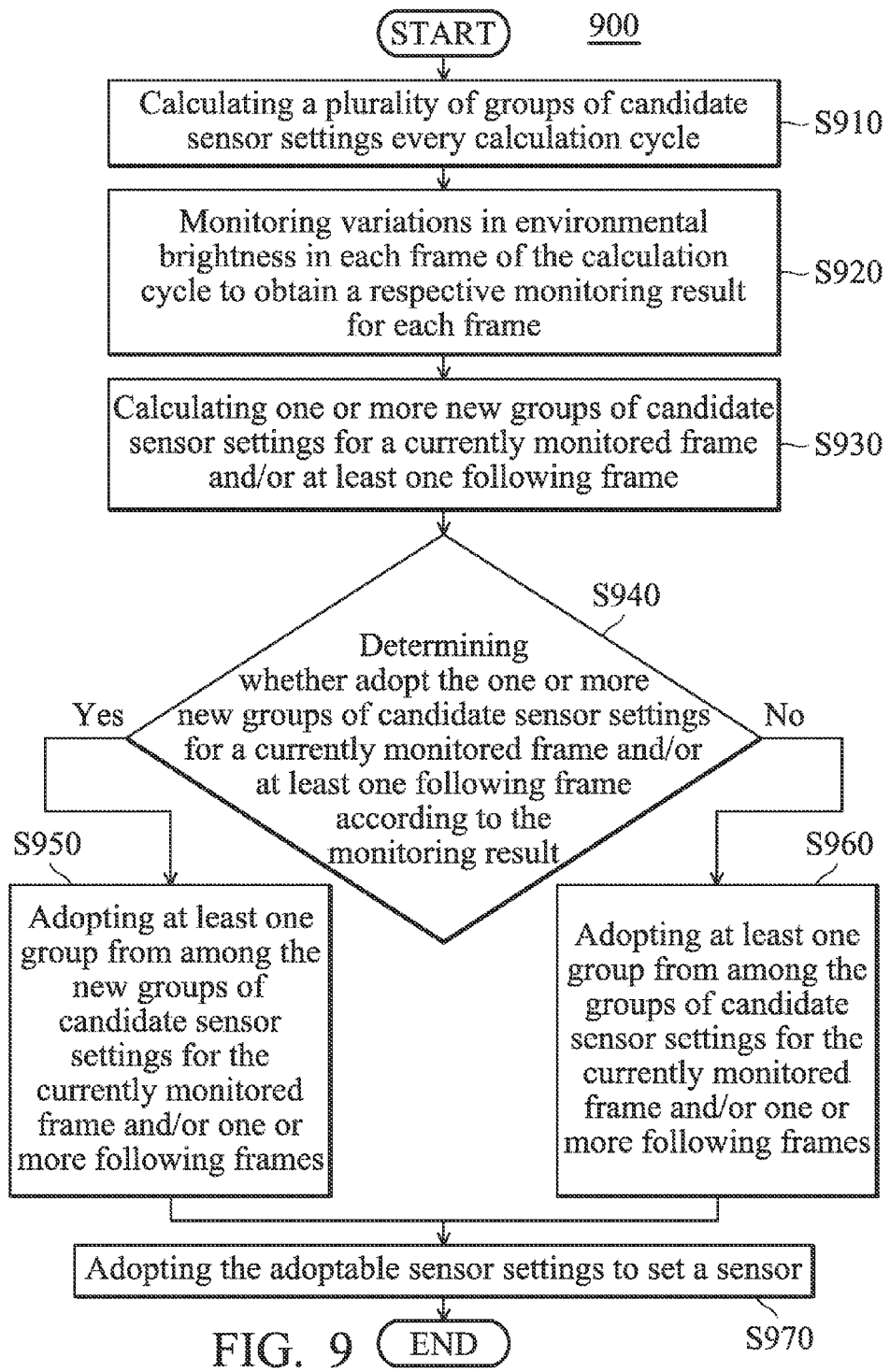
FIG. 9 is a flow chart illustrating the method for setting a sensor according to another embodiment of the invention.

FIG. 9 is a flow chart 900 illustrating the method for setting a sensor according to another embodiment of the invention. The method for setting a sensor may be applied to the electronic device 100. As shown in FIG. 9, in step S910, the electronic device 100 calculates a plurality of groups of candidate sensor settings every calculation cycle, wherein each calculation cycle comprises one or more frames, and each of the groups of settings corresponds to a respective one frame of the calculation cycle.

In step S920, the electronic device 100 monitors variations in environmental brightness in each frame of the calculation cycle to obtain a respective monitoring result for each frame. In step S930, the electronic device 100 calculates one or more new groups of candidate sensor settings for a currently monitored frame and/or at least one following frame.

In step S940, the electronic device 100 determines whether adopt the one or more new groups of candidate sensor settings for a currently monitored frame and/or at least one following frame according to the monitoring result.

When the monitoring result indicates that the variation of the environmental brightness is higher than the threshold, step S950 is performed. In step S950, the electronic device 100 adopts at least one group from among the new groups of candidate sensor settings for the currently monitored frame and/or one or more following frames.

When the monitoring result indicates that the variation of the environmental brightness is not higher than the threshold, the threshold, step S960 is performed. In step S960, the electronic device 100 adopts at least one group from among the groups of candidate sensor settings for the currently monitored frame and/or one or more following frames.

In step S970, the electronic device 100 adopts the adoptable sensor settings to set a sensor.

For conventional AE technology, in one calculation cycle, only one group of sensor settings is generated for a plurality of frames (e.g. more than 3 frames) of the calculation cycle. Therefore, according to the methods for setting a sensor, the reaction time for updating the sensor setting can be decreased and the fluency of the image can be better. In addition, according to the methods for setting a sensor, when the environmental brightness is changed, the digital camera can update the sensor setting in time.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

In the embodiments, multiple groups of sensor settings may be calculated. In addition, whether to adopt new group(s) of sensor setting may be determined every frame. Accordingly, compared to the conventional AE scheduling method, either or both of fluency and reaction time can be enormously improved in the embodiments.

Reference throughout this specification to "one embodiment" or "an embodiment" means that a particular feature, structure, or characteristic described in connection with the embodiment is included in at least one embodiment of the invention, but do not denote that they are present in every embodiment. Thus, appearances of the phrases "in one embodiment" or "in an embodiment" in various places throughout this specification are not necessarily referring to the same embodiment of the invention.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
a sensor; and
a processor, coupled to the sensor, configured to calculate a plurality of groups of candidate sensor settings every calculation cycle, and each of the groups of candidate sensor settings corresponds to a respective one frame of the calculation cycle; determine a respective group of adoptable sensor settings for each frame of the calculation cycle according to the plurality of groups of candidate sensor settings every frame of the calculation cycle, wherein the respective group of adoptable sensor settings are adopted by the processor to set the sensor,
wherein each calculation cycle comprises two or more frames,
wherein each of the plurality of groups of candidate sensor settings comprises at least one of an automatic exposure time, a gain, and an aperture size, and
wherein the processor is further configured to calculate one or more respective total values for one or more parameters of the candidate sensor settings, and allocate each of the total values to the frames of the calculation cycle by a respective percentage of the parameter for each frame.

2. The electronic device of claim 1, wherein the plurality of groups of candidate sensor settings are calculated in a first frame of the one or more frames of the calculation cycle in sequence.

3. A processor capable of setting a sensor, comprising:
a calculating circuit, configured to calculate a plurality of groups of candidate sensor settings every calculation cycle, and each of the groups of settings corresponds to a respective one frame of the calculation cycle;
a determination circuit, configured to determine a respective group of adoptable sensor settings for each frame of a calculation cycle according to the plurality of groups of candidate sensor settings every frame of the calculation cycle; and
an output circuit, configured to output the respective group of adoptable sensor settings for setting a sensor,
wherein the respective group of adoptable sensor settings are adopted by the processor to set the sensor,
wherein each calculation cycle comprises two or more frames,
wherein each of the plurality of groups of candidate sensor settings comprises at least one of an automatic exposure time, a gain, and an aperture size, and
wherein the calculating circuit is further configured to calculate one or more respective total values for one or more parameters of the candidate sensor settings, and allocate each of the total values to the frames of the calculation cycle by a respective percentage of the parameter for each frame.

4. The processor of claim 3, wherein the plurality of groups of candidate sensor settings are calculated in a first frame of the calculation cycle in sequence.

5. The processor of claim 3, wherein the determination circuit is further configured to determine whether to adopt or abandon a corresponding group of the groups of candidate sensor settings as the respective group of adoptable sensor settings for each frame of the calculation cycle.

6. The processor of claim 5, wherein the determination circuit is further configured to replace at least one abandoned group of the plurality of groups of candidate sensor settings with at least one new group of candidate sensor settings.

7. The processor of claim 3, further comprising:
a monitor circuit, configured to obtain a respective monitoring result for each of the one or more frames, wherein the monitoring result indicates monitored variations in environmental brightness in each of the one or more frames of the calculation cycle, and the calculating circuit determines whether to calculate one or more new groups of candidate sensor settings for a currently monitored frame and/or at least one following frame according to the monitoring result.

8. The processor of claim 7, wherein when the monitoring result indicates that a variation of the environmental brightness is higher than a threshold, the calculating circuit calculates the one or more new groups of candidate sensor settings for the currently monitored frame or for at least one following frame.

9. The processor of claim 8, wherein when the monitoring result indicates that the variation of the environmental brightness is higher than the threshold, the calculating circuit adopts at least one group from the new groups of candidate sensor settings for the currently monitored frame or for at least one following frame; and when the monitoring result indicates that the variation of the environmental brightness is not higher than the threshold, the calculating circuit adopts at least one group from among the groups of candidate sensor settings for the currently monitored frame or for at least one following frame.

10. The processor of claim 3, further comprising:
a monitor circuit, configured to obtain a respective monitoring result for each of the one or more frames, wherein the monitoring result indicates monitored variations in environmental brightness in each of the one or more frames of the calculation cycle, and the calculating circuit calculates one or more new groups of candidate sensor settings for a currently monitored frame and/or at least one following frame, and determines to adopt the one or more groups of candidate sensor settings or the one or more new groups of candidate sensor settings for a currently monitored frame and/or at least one following frame according to the monitoring result.

11. The processor of claim 10, wherein when the monitoring result indicates that the variation of the environmental brightness is higher than the threshold, the calculating circuit adopts at least one group from the new groups of candidate sensor settings for the currently monitored frame and/or the one or more following frames; and when the monitoring result indicates that the variation of the environmental brightness is not higher than the threshold, the calculating circuit adopts at least one group from the one or more groups of candidate sensor settings for the currently monitored frame and/or the one or more following frames.

12. A method for setting a sensor, comprising: calculating a plurality of groups of candidate sensor settings every calculation cycle, and each of the groups of settings corresponds to a respective one frame of the calculation cycle; determining a respective group of adoptable sensor settings for each frame of a calculation cycle according to the plurality of groups of candidate sensor settings every frame of the calculation cycle,
adopting the respective group of adoptable sensor settings to set the sensor, wherein each calculation cycle comprises two or more frames, wherein each of the plurality of groups of candidate sensor settings comprises at least one of an automatic exposure time, a gain, and an aperture size, and wherein calculating the plurality of groups of candidate sensor settings every calculation cycle further comprises:

calculating one or more respective total values for one or more parameters of the candidate sensor settings; and allocating each of the total values to the frames of the calculation cycle by a respective percentage of the parameter for each frame.

13. The method for setting a sensor of claim 12, wherein the plurality of groups of candidate sensor settings are calculated in a first frame of the calculation cycle in sequence.

14. The method for setting a sensor of claim 12, wherein determining the respective group of adoptable sensor settings for each frame of the calculation cycle according to the plurality of groups of candidate sensor settings every frame of the calculation cycle comprises determining whether to adopt or abandon a corresponding group of the groups of candidate sensor settings as the respective group of adoptable sensor settings for each frame of the calculation cycle.

15. The method for setting a sensor of claim 14, wherein determining the respective group of adoptable sensor settings for each frame of a calculation cycle according to the plurality of groups of candidate sensor settings every frame of the calculation cycle further comprises replacing at least one abandoned group of the plurality of groups of candidate sensor settings with at least one new group of candidate sensor settings.

16. The method for setting a sensor of claim 12, further comprising:

obtaining a respective monitoring result for each of the one or more frames, wherein the monitoring result indicates monitored variations in environmental brightness in each of the one or more frames of the calculation cycle; and determining whether to calculate one or more new groups of candidate sensor settings for a currently monitored frame and/or at least one following frame according to the monitoring result.

17. The method for setting a sensor of claim 16, wherein determining whether to calculate one or more new groups of candidate sensor settings for a currently monitored frame and/or the one or more following frames according to the monitoring result comprises:

when the monitoring result indicates that a variation of the environmental brightness is higher than a threshold, calculating the one or more new groups of candidate sensor settings for the currently monitored frame and/or the one or more following frames.

18. The method for setting a sensor of claim 17, wherein determining the respective group of adoptable sensor settings for each frame of the calculation cycle according to the plurality of groups of candidate sensor settings every frame of the calculation cycle comprises:

when the monitoring result indicates that the variation of the environmental brightness is higher than the threshold, adopting at least one group from the new groups of candidate sensor settings for the currently monitored frame and/or the one or more following frames; and when the monitoring result indicates that the variation of the environmental brightness is not higher than the threshold, adopting at least one group from among the groups of candidate sensor settings for the currently monitored frame and/or the one or more following frames.

19. The method for setting a sensor of claim 12, wherein determining a respective group of adoptable sensor settings for each frame of a calculation cycle according to the plurality of groups of candidate sensor settings every frame of the calculation cycle comprises:

obtaining a respective monitoring result for each of the one or more frames, wherein the monitoring result indicates monitored variations in environmental brightness in each of the one or more frames of the calculation cycle;

calculating one or more new groups of candidate sensor settings for a currently monitored frame and/or at least one following frame; and determining to adopt the one or more groups of candidate sensor settings or the one or more new groups of candidate sensor settings for a currently monitored frame and/or at least one following frame according to the monitoring result.

20. The method for setting a sensor of claim 19, wherein in determining to adopt the one or more groups of candidate sensor settings or the one or more new groups of candidate sensor settings for a currently monitored frame and/or at least one following frame according to the monitoring result:

when the monitoring result indicates that the variation of the environmental brightness is higher than the threshold, adopting at least one group from the new groups of candidate sensor settings for the currently monitored frame and/or the one or more following frames; and when the monitoring result indicates that the variation of the environmental brightness is not higher than the threshold, adopting at least one group from the groups of candidate sensor settings for the currently monitored frame and/or the one or more following frames.

* * * * *